F. M. WYBLE.
STONE PICKER.
APPLICATION FILED JAN. 26, 1917.
1,316,130.
Patented Sept. 16, 1919.
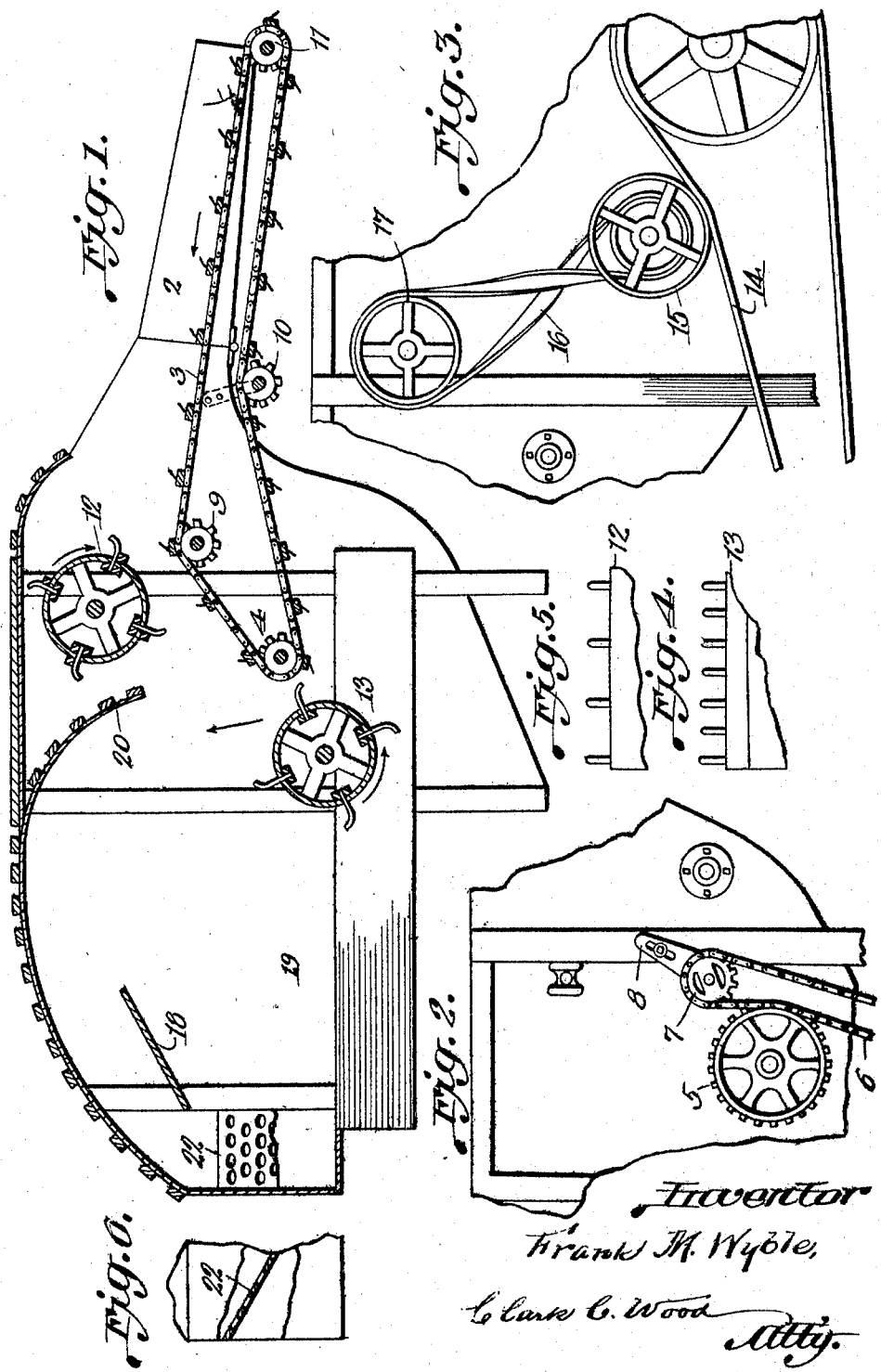

UNITED STATES PATENT OFFICE.

FRANK M. WYBLE, OF LANSING, MICHIGAN.

STONE-PICKER.

1,316,130.  Specification of Letters Patent. Patented Sept. 16, 1919.

Application filed January 26, 1917. Serial No. 144,726.

*To all whom it may concern:*

Be it known that I, FRANK M. WYBLE, a citizen of the United States, residing at Lansing, in the county of Ingham and State of Michigan, have invented a new and useful Improvement in Stone-Pickers, of which the following is a specification.

My invention relates more especially to devices used for removing stones from beans in the process of threshing and its purposes are to make a device that, while it shall be simple in construction, shall effectively remove all stones whatever their size from the beans and shall deposit them in a place by themselves as may be decided upon in the construction of the machine, separate entirely not only from the threshed beans but from the pods and other refuse.

I attain these purposes by the means shown in the accompanying drawings, in which Figure 1 is a longitudinal section of that part of my device, adapted to be attached to a bean separator. The separator itself is not shown because it forms no part of my invention and may be of any approved or desired construction. Fig. 2 is an elevation of a small part of the left hand side of my device showing the method of driving the raddle or belt which carries the beans to the stone picking mechanism. Fig. 3 is a corresponding view of the right hand side of the device showing the method of driving the two beaters to be hereafter more fully described. Figs. 4 and 5 show the arrangement of the teeth on the beaters 13 and 12 respectively. Fig. 6 is a detail showing the arrangement of the sieve 22.

Referring more particularly to the drawings, 1 is the main body of my device which is adapted to be mounted on the feed end of any approved form of bean thresher. The description of the mechanism is preferably made in connection with a description of the method of operation.

In operating my device, the unthreshed beans are thrown first upon the feed table 2 falling upon the raddle or endless belt 3, which is driven by a sprocket wheel 4 and sprocket 5, the sprockets being driven by the sprocket chain 6, which in turn is driven in any desired manner from the mechanism of the bean thresher itself, the exact place and manner of its connection being determined by the type of the thresher to which it may be attached and varying therefore with that type. It is therefore not shown in the drawings. The sprocket chain 6 is adjusted by an idler sprocket 7 adjustably connected as by the slide and bolt 8 to the main frame of my device, but any other desired means of effecting this adjustment may be employed without departing from my invention. The raddle 3 is guided and kept in place by passing over idlers 9, 10 and 11. This raddle moves in the direction indicated by the arrow and deliver the beans to the upper beater 12 which revolves in the direction indicated by the arrow. The function of this beater is two-fold: first, to beat, spread out and loosen the mass of vines and pods, and, second, if any stones lie on the upper surface to beat them down in the direction of the lower and main working beater. From the beater 12 the pods travel on with the raddle 3 to the lower beater 13, in which the teeth are much closer together as appears by comparing Figs. 4 and 5. The sprocket wheels 4 and 9 are so placed with reference to the beater 13 that the raddle passing over those sprockets form substantially a radial line with reference to the beater 13. That is, they deliver the pods to the beater 13 substantially in a radial direction. The beaters 12 and 13 are driven from the main driving mechanism of the thresher in any suitable manner preferably as shown in Fig. 3, in which the beater 13 is driven directly from the main thresher belt 14 by the pulley 15, which in turn drives the beater 13 by the cross belt 16 and pulley 17, but it is evident that this part also of my invention might be considerably varied without departing from the invention.

The beaters 12 and 13 are driven at a comparatively high rate of speed, preferably from 500 to 700 revolutions per minute, but the rate of speed may be varied for the character of the work that is to be done. When the mass of beans, vines, etc., strike the beater 13 they are thrown off in a tangential direction. The beans and pods being lighter and more bulky meet a greater resistance from the air and fall below the shield 18 into the space 19 and thence to the cylinder of the thresher proper, which forms no part of my invention and, as already stated, may be of any approved design. If any stones, however, are found they are thrown with greater force, in the direction indicated by the arrow and strike the inside of the curved guide 20 which is formed of such radius and placed in such a position as shall effectively bring about the desired separation between beans, vines, etc., and stones and shall also serve as a guide to the stones in their travel toward the point of discharge. The inertia of the stones combined with their velocity causes them to travel along the inside of the curved shield 20. If any of them lose velocity and fall they are caught by the shield 18, the position of which is such as to catch, as already stated, all stones the velocity and force of which is not sufficient to keep them continually in contact with the interior surface of the shield 20. When the stones reach the rear end 21 of the shield 20, they and also all that have fallen upon the shield 18, fall upon the sieve 22 which is arranged at an angle across the end of the device as shown in Fig. 1. This sieve is supplied with perforations of such size that any beans that may fall on it fall through into the space 19 and go on through the thresher, but the stones roll down and are delivered on the ground at the outside in the rear and side of the device. The upper beater 12 is placed in such a position with reference to raddle 3 as to most effectively beat up, loosen and flatten out the layer of vines and pods dumped on the raddle as already stated, the exact distance being determined by the size of the machine and the rapidity of the desired feed. Or, if desired, the position of the beater 12 may be made adjustable in any of the well-known manners.

I claim as my invention and desire to secure by Letters Patent:

1. In a stone picker for removing stones from crops, the combination of a rapidly revolving beater, means for delivering crops to the beater approximately on a radial line, said beater being adapted to expel stones in the material fed thereto outwardly therefrom, and a guide having a guiding surface positioned in the path of travel of the moving stones to direct the stones thrown outwardly from the beater to a point of discharge located remotely of the beater.

2. In a stone picker for removing stones from crops, the combination of a rapidly revolving beater, means for delivering crops to the beater approximately on a radial line, said beater being adapted to expel stones in the material fed thereto outwardly therefrom, a guide arranged to direct the stones thrown outwardly from the beater to a point of discharge, and means associated with said guide for separating the stones from the crops.

3. The combination in a stone picker for removing stones from crops, of a rapidly revolving beater; means for delivering the crops to said beater approximately on a radial line; a guide adapted to direct the stones to the point of discharge, and means for separating the stones from the crops, said means comprising an inclined shield beneath said guide and an inclined sieve adapted to receive and separate vegetable matter and stones that may fall upon it.

4. In a stone picker for removing stones from crops, the combination of a rapidly revolving beater, means for delivering crops to the beater approximately on a radial line, said beater being adapted to expel stones in the material fed thereto outwardly therefrom, and a curved guide positioned to receive the stones expelled by the beater and direct them to a point of discharge.

5. In a stone picker for removing stones from crops, the combination of a rapidly revolving beater, means for delivering crops to the beater, the beater being adapted to expel stones in the material fed thereto outwardly therefrom, and a guide extending rearwardly of the beater and adapted to direct stones thrown outwardly from the beater to a point of discharge.

6. In a stone picker for removing stones from crops, the combination of a rapidly revolving beater, means for delivering crops to the beater, the beater being adapted to expel stones in the material fed thereto outwardly therefrom, and a guide disposed above the beater and having a guiding surface arranged in the path of travel of the expelled stones for directing the stones to a point of discharge.

7. In a stone picker for removing stones from crops, the combination of a rapidly revolving beater, means for delivering crops to the beater, the beater being adapted to expel stones in the material fed thereto outwardly therefrom, a guide extending above the beater arranged to receive stones expelled from the beater and to direct them to a point of discharge, and a shield beneath said guide.

8. In a stone picker for removing stones from crops, the combination of a rapidly revolving beater, means for delivering crops to the beater, the beater being adapted to expel stones in the material fed thereto outwardly therefrom, a guide extending above the beater arranged to receive stones expelled from the beater and to direct them to a point of discharge, a shield beneath said guide, and a screen at the delivery end of the guide to separate the stones from the crops.

FRANK M. WYBLE.